July 23, 1946.  M. C. POYLO  2,404,403
RADIO MOUNTING STRUCTURE
Filed Feb. 13, 1943   2 Sheets-Sheet 1
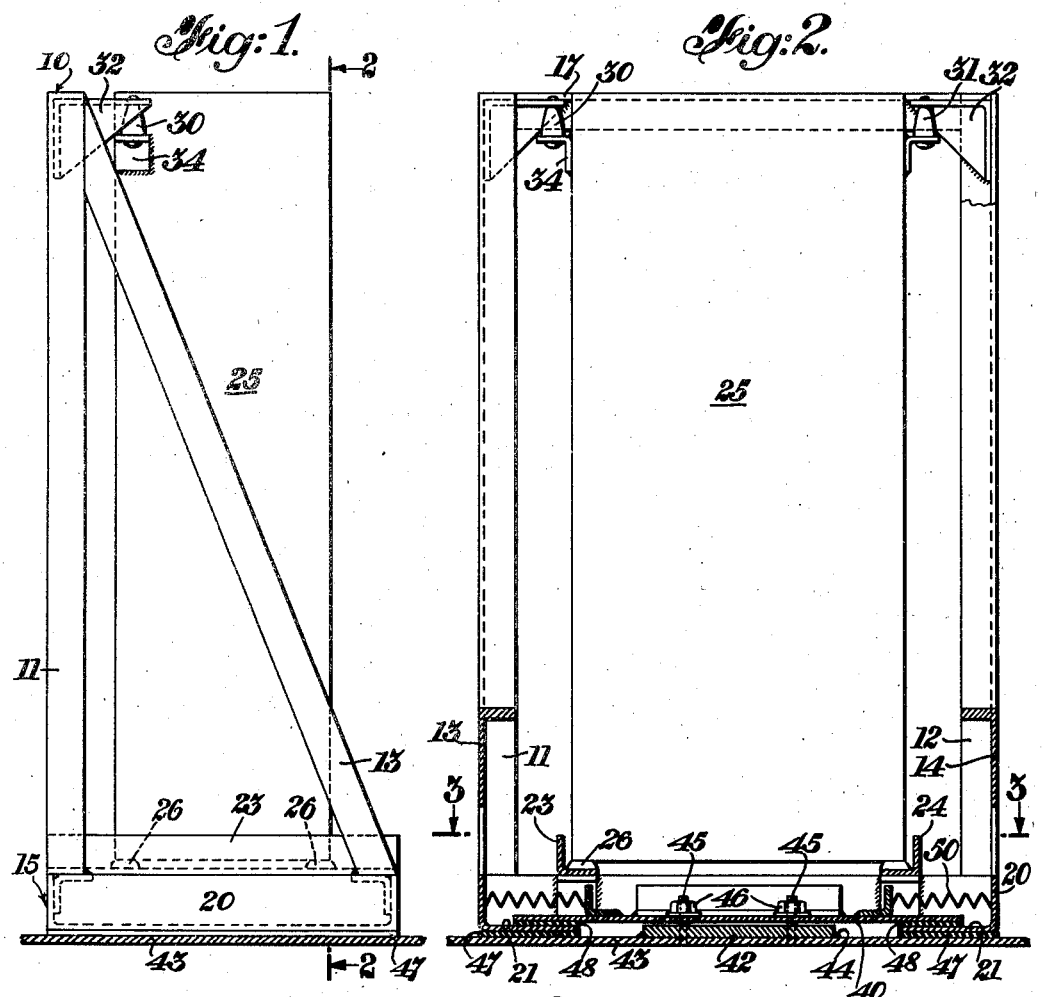
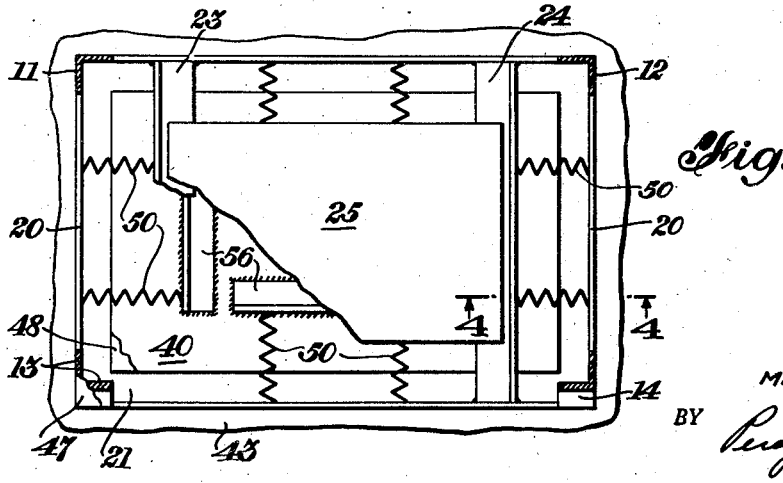
INVENTOR.
MICHAEL C. POYLO
BY Percy P. Lantz
ATTORNEY July 23, 1946.                M. C. POYLO                2,404,403
RADIO MOUNTING STRUCTURE
Filed Feb. 13, 1943                2 Sheets-Sheet 2
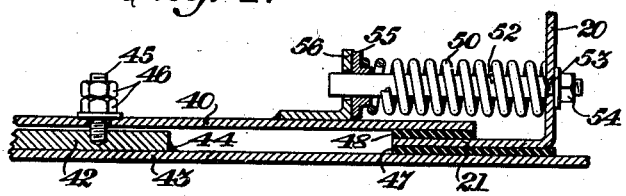
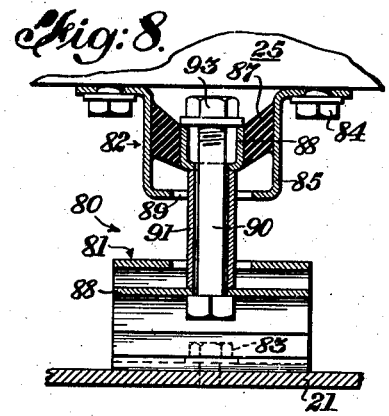
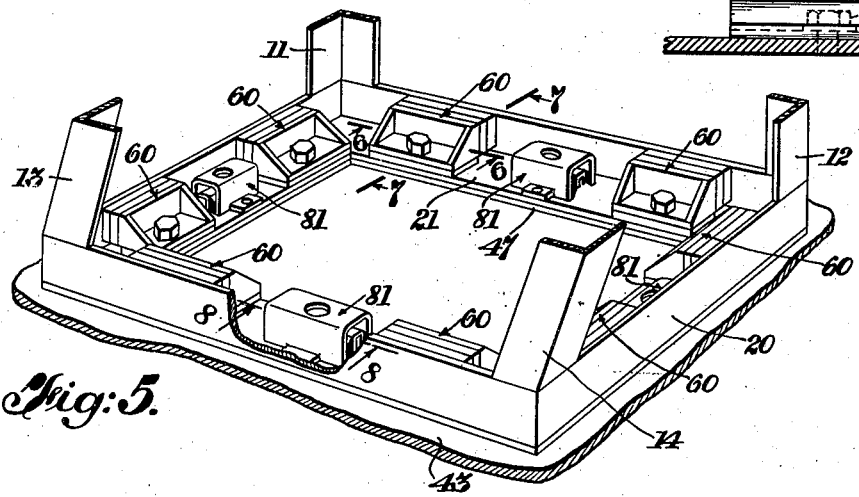
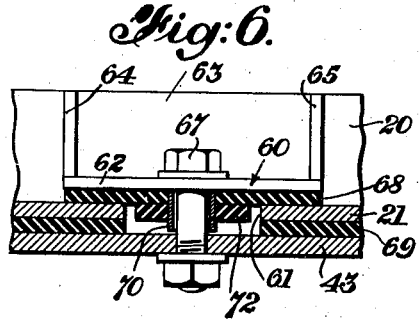
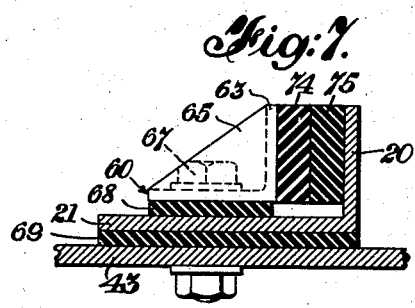
INVENTOR.
MICHAEL C. POYLO
BY
*Percy P. Lantzy*
ATTORNEY Patented July 23, 1946

2,404,403

UNITED STATES PATENT OFFICE 2,404,403

RADIO MOUNTING STRUCTURE

Michael C. Poylo, New York, N. Y., assignor to Federal Telephone and Radio Corporation, Newark, N. J., a corporation of Delaware Application February 13, 1943, Serial No. 475,718

10 Claims. (Cl. 248—358)

This invention relates to supports and more particularly to a supporting structure for radio and other equipment easily damaged by shock, vibration and rolling movement such as may be experienced on board ships, aircraft or on trains and other vehicles.

Radio equipment heretofore, in the case of ships, for example, has been usually secured fast to the deck of a ship with some provision to resist vibrations and rolling movements. Such mountings are usually satisfactory to overcome normal disturbances due to vibration of propellers and the rolling and pitching of ships. They, however, are not satisfactory in a case of abnormal vibration and shocks such as caused by the firing of guns, collisions with other craft and obstacles and the impacts of enemy shells, bombs, mines and torpedoes. Such abnormal vibration and shock usually shears or otherwise damages the supporting mounts thereby resulting in serious damage to the radio equipment rendering it impossible to transmit the disposition of the ship or to give desired information to friendly forces regarding the presence of enemy craft.

In order for radio equipment to withstand such adverse conditions, encountered in naval and maritime use, the mounting structure for such equipment must be able to withstand a series of severe tests. For these tests a space of fixed height, width and depth is provided into which the equipment and its supporting structure may be placed. Further, the supporting structure may only be secured from one deck such as the deck upon which the equipment is to be located so that rocking of the ship's frame will not disable the equipment. The equipment must be able to withstand vibrations and shocks when supported on the level and at angles up to 45° to the horizontal.

It is an object of my invention to provide a relatively simple and sturdy supporting structure for radio cabinets and other similar equipment, which is capable of sustaining satisfactorily vibration and shocks such as may be experienced in Navy and other maritime use.

It is known that should the surface upon which an object is resting be given a high acceleration, the acceleration produced on the object will be an inverse function of the displacement of the object with regard to the surface. This function depends mainly on the coefficient of friction between the object and the surface. The supporting mounts of my invention are based upon this principle, the supporting structure being allowed to have a limited movement with regard to the deck of the ship when the deck responds to forces of shock. The mounting structure of my invention as will be clear from the following detailed description is such that the resistance to shock is substantially the same regardless of the direction at which the forces of shock occur.

For a further understanding of the invention, reference may be had to the following detailed description to be read in connection with the accompanying drawings, in which:

Fig. 1 is a view in side elevation of a radio cabinet support in accordance with one embodiment of my invention;

Fig. 2 is a view in vertical section taken along line 2—2 of Fig. 1;

Fig. 3 is a view in horizontal section taken along line 3—3 of Fig. 2;

Fig. 4 is a vertical sectional view taken along line 4—4 of Fig. 3;

Fig. 5 is a view in perspective of the base portion of another embodiment of my invention, and Figs. 6, 7 and 8 are sectional views of parts taken along lines 6—6, 7—7 and 8—8, respectively, of Fig. 5.

Referring to Figs. 1 to 4 of the drawings, I have shown for purposes of illustration an embodiment comprising a radio cabinet supporting cradle 10 provided with the shock and vibration resisting features of my invention. The cradle is a frame structure having a rectangular base 15 with two vertical posts 11 and 12 at the back side corners of the base and two inclined posts 13 and 14 at the front corners. The posts or rails 13 and 14 extend backwardly and are joined to the tops of the vertical posts 11 and 12 respectively. The tops of the posts 11 and 12 are joined together by a cross piece 17. The posts may be further braced by additional cross pieces as may be desired.

The base 15 preferably is in the form of a rectangular box the side walls 20 of which are provided with an inwardly extending bottom flange 21 which is adapted to rest upon a flat surface such as a deck of a ship. Angle iron cross pieces 23 and 24 are mounted on the sides 20 and are adapted to receive the base of a cabinet 25. Resilient vibration eliminating units or feet 26 are provided between the cross pieces 23 and 24 and the bottom of the cabinet. The upper end of the cabinet is steadied against vibration and tilting movements by resilient units 30 and 31 mounted between brackets 32 on the cradle and brackets 34 on the cabinet. These resilient members 30 and 31 are of known construction comprising a block of rubber or the like into which a mounting ring is partially imbedded thereabout and a mounting bolt disposed axially of the ring through the rubber. These resilient mounts 26, 30 and 31 sustain the cabinet from vibrations and tilting movements of the deck.

In order to protect the cabinet and also the cradle from destructive forces of shock, I provide the base of the cradle with a clamping and resilient positioning arrangement so that the cradle and cabinet will have a limited movement with respect to the deck when shocks occur. As shown more particularly in Figs. 2, 3 and 4, I provide a clamping member 40 the peripheral edge portions of which are adapted to overlie the flange 21 of the cradle. Beneath the member 40, I provide a stationary support 42 which may be welded or otherwise made fast to the deck 43 as shown at 44. Anchored in the member 42 are bolts 45 which extend upwardly through openings in the member 40 so that by adjustment of the nuts 46 the member 40 may be tightened downwardly on to the member 42.

In order to increase the coefficient of friction of the flange 21 of the cradle with the surfaces of the member 40 thereabove and the deck 43 therebelow, I provide liners of material such as asbestos or brake lining 47 and 48 between the surfaces of these parts. For example, the lining 47 may be made fast by known means to the bottom surface of the flange 21 while the lining 48 may be made fast to the bottom surface of the member 40 or to the top surface of the flange 21. By adjusting the nuts 46, the member 40 may be clamped with the desired forces against the flange 21.

Besides the frictional engagement of the clamping member 40 and the flange 21, I provide a plurality of compression elements such as coil springs 50 two for each side of the cradle as indicated in Fig. 3. Each of these springs may be anchored to the wall 20 of the cradle as shown in Fig. 4 by a bolt 52 having a threaded shank received in an opening 53 and held tightly to the wall 20 by a nut 54. The bolt 52 may extend into a socket of a spring abutment 55 supported on an upright support 56 carried by the member 40. Upon a compression of the spring, the free end of the bolt is movable through the upright 56 permitting the opening to limit the displacement of the cradle. With eight of these resilient connections positioned about the member 40, any movement of the cradle with respect to the member 40 will be resisted not only by the action of the springs 50 but also by the friction between flanges 21 and the clamping surface of the member 40 and the deck 43. The reaction of the springs 50 is such as to bias the cradle toward a given position with respect to the member 40.

While I have shown the embodiment in Figs. 1 to 4 as being provided with springs 50, it will be understood that other resilient material such as rubber segments capable of giving a displacement of about 1" more or less may be substituted for the springs 50. Also, instead of using springs under compression an arrangement whereby the springs are maintained under tension may be used. Also, the springs, etc., may be secured to member 40 instead of wall 20.

In Figs. 5 to 8, I show a second embodiment of the vibration and shock resisting support of my invention wherein a plurality of clamping members are provided at spaced points along the flange 21. The flange 21 in this embodiment is provided with openings 61 over which the clamping members 60 are located, the outer portions of the members overlying in clamping relation portions of the flange 21. The clamping members 60 may be of any suitable shape and as shown, for purposes of illustration, they may be constructed of angle iron each having a horizontal portion 62 and a vertical portion 63. I reinforce the member by welding or otherwise securing triangular pieces 64 and 65 to the horizontal and vertical portions at the ends of the member. The horizontal portion 62 is provided with an opening through which a bolt 67 extends for threaded engagement with a threaded opening formed in the deck 43 or other platform upon which the cradle is mounted. The bottom portion 62 of the clamping member is provided with a friction liner 68 similarly as in the case of the liner 48 for the member 40 (Fig. 4). A rubber liner 69 on the underside of flange 21 minimizes the vertical component of shocks.

To limit the movement of the cradle with respect to the bolt 67 and therefore the deck surface upon which the cradle is mounted, I provide a rubber washer 72 which will resiliently resist the movement of the flange 21 with respect to a sleeve 70 which surrounds the bolt 67. Disposed between the upright portion 63 of the member 60 and wall 20 I provide resilient bumpers made of "Permacell" (sponge rubber) 74 and hard rubber 75 so as to further resiliently limit horizontal displacement of the cradle. As shown in Fig. 5, the cradle is provided with eight of these clamping members 60. It will be understood, however, that a number greater or less than eight may be used if desired.

Interposed between the clamping members 60 along each side of the cradle is a vibration resisting connection 80. This connection comprises two resilient bracket arrangements 81 and 82 one disposed at right angles with respect to the other. The bracket 81 is secured to the flange 21 by bolts 83 one on each side thereof and the bracket 82 is secured by bolts 84 to the cabinet 25. If desired, the bracket 82 may be secured to a supporting bracket such as the cross pieces 23 and 24 of Fig. 2.

The brackets 81 and 82 are substantially identical, each being generally of the form of a U-shaped channel member, the sectional view of the bracket 82 in Fig. 8 being at right angles to the sectional view of bracket 81. The inner sides of the channel member 85 of bracket 82, for example, are provided with resilient web members 87 to which is secured a second smaller channel member 88. The two channel members are provided with aligned openings for passage of a securing bolt 90. The opening 89 in the larger member 85 is large enough to receive a sleeve 91 which engages the bottom of the smaller channel member 88 so that when the bracket connections are made tight by tightening the nut 93 on the bolt, the sleeve 91 makes a strong connection between the two channel members 88 of the brackets 81 and 82.

During the application of forces tending to vibrate, tilt or force the cabinet upwardly relative to the deck or the cradle, the resilient web members 87 resist the action of these forces. Since the brackets are disposed at right angles to each other, the forces tending to vibrate, tilt or twist the equipment are resisted regardless of the direction in which the vibration occurs.

From the foregoing description, it will be clear that I have provided a vibration and shock resisting support for radio cabinets which is especially suitable for use on board ships. The displacement of the cradle in response to shocks of great force is in accordance with the features of my invention limited to about 1" more or less which is well within the requirements laid down by the Navy. Further, by my supporting structure forces of shock applied to the deck or platform supporting the cradle are greatly reduced before they can be transmitted to the cabinet 25.

While I have shown the principles of my invention in connection with two specific embodiments, it will be understood that they are given by way of example only and not as limiting the scope of the invention as set forth in the object and the appended claims.

I claim:

1. A shock and vibration resisting support for radio cabinets and the like comprising a cradle upon which a cabinet may be mounted, said cradle having a base member adapted to rest with frictional engagement upon a flat surface such as the deck of a ship, means to force said base member toward said surface thereby increasing the frictional engagement of said base member with said surface, and resilient means to bias said cradle from laterally directed forces for retention substantially in a given position with respect to said surface.

2. The support defined in claim 1 wherein the base member is provided with means on the bottom surface thereof to increase the coefficient of friction between the base and said surface, and the means to force the base member toward said surface includes friction exerting material urged against said member.

3. A shock and vibration resisting support for radio cabinets and the like comprising a cradle in which a cabinet may be mounted, said cradle having a base adapted to rest with frictional engagement upon a flat surface such as the deck of a ship, said base having an inwardly extending bottom flange, clamping means having a portion thereof in overlying relation with a portion of the flange, and means to secure said clamping means to said deck so as to clamp said flange against said deck.

4. The support defined in claim 3 wherein said flange is lined with material to increase the coefficient of friction between the cradle and the surface of the deck, and said clamping means is provided with a lining of material over the surface thereof overlying said flange so as to increase the coefficient of friction between said clamping means and said flange.

5. The support defined in claim 3 wherein said flange is provided with openings therein, and the clamping means comprises a plurality of members one each overlying one of the openings in said flange with the outer edge portion of the member overlying a portion of the flange, and the securing means comprises adjustable elements extending from said deck through said openings whereby each member can be adjustably secured to said deck to clamp said flange against the surface of the deck.

6. The support defined in claim 3 wherein the clamping means includes upright portions, and resilient means disposed between said upright portions and the side portions of said cradle to resiliently resist displacement of the cradle with respect to a given position relative to said deck surface.

7. The support defined in claim 3 wherein said flange is provided with openings therein, and the clamping means comprises a plurality of members one each overlying one of the openings in said flange with the outer edge portion thereof overlying a portion of the flange, and the securing means comprises adjustable elements extending from said deck through said openings whereby each member can be adjustably secured to said deck to clamp said flange against the surface of the deck, and each clamping member has an upright portion thereon and resilient means disposed between the upright portion and a side portion of said cradle.

8. The support defined in claim 3 wherein the flange of said cradle is provided with openings therein, and the clamping means comprises a plurality of members one each overlying one of the openings in said flange with the outer edge portion thereof overlying a portion of the flange, and the securing means for each member comprises a bolt secured to said deck extending upwardly through one of said openings, a sleeve to receive the bolt and a rubber washer disposed about said sleeve and located in the opening of said flange so as to resiliently limit horizontal displacement of said cradle.

9. A shock and vibration resisting support for radio cabinets and the like comprising a cradle in which a cabinet may be mounted, said cradle having a base adapted to rest with frictional engagement upon a flat surface such as the deck of a ship, said base having an inwardly extending bottom flange, a member disposed with the peripheral edge portion thereof in overlying relation with the inner edge portion of the flange, means to secure said member to said deck so as to clamp said flange between the member and said deck, and vibration resisting means for said cradle comprising resilient elements disposed between said bottom flange and the bottom portion of said cabinet and other resilient elements between the top of said cabinet and the top portion of said cradle.

10. The support defined in claim 9 wherein the resilient vibration resisting elements disposed between the bottom flange and the bottom portion of the cabinet comprises two brackets one secured to the cradle and one to the cabinet, each of the brackets having a resilient core and means passing through said cores to secure the two brackets together.

MICHAEL C. POYLO.